US007953596B2

(12) United States Patent
Pinto

(10) Patent No.: US 7,953,596 B2
(45) Date of Patent: May 31, 2011

(54) METHOD OF DENOISING A NOISY SIGNAL INCLUDING SPEECH AND NOISE COMPONENTS

(75) Inventor: Guillaume Pinto, Paris (FR)

(73) Assignee: PARROT Societe Anonyme, Paris (FR)

( * ) Notice: Subject to any disclaimer, the term of this patent is extended or adjusted under 35 U.S.C. 154(b) by 1070 days.

(21) Appl. No.: 11/710,613

(22) Filed: Feb. 26, 2007

(65) Prior Publication Data

US 2007/0276660 A1 Nov. 29, 2007

(30) Foreign Application Priority Data

Mar. 1, 2006 (FR) ..................................... 06 01822

(51) Int. Cl.
*G10L 15/20* (2006.01)

(52) U.S. Cl. ......... 704/233; 704/E21.002; 704/E21.009; 381/71.1; 381/71.4; 381/71.12

(58) Field of Classification Search .................. 704/233, 704/E21.002, E21.009; 381/71.1, 71.4, 71.12
See application file for complete search history.

(56) References Cited

U.S. PATENT DOCUMENTS 4,658,426 A 4/1987 Chabries et al.
5,251,263 A * 10/1993 Andrea et al. ............... 381/71.6
5,742,694 A 4/1998 Eatwell et al.
5,924,061 A * 7/1999 Shoham ........................ 704/218
6,691,092 B1 * 2/2004 Udaya Bhaskar et al. .... 704/265
7,533,015 B2 * 5/2009 Takiguchi et al. ............ 704/205
7,813,499 B2 * 10/2010 Chhetri et al. ........... 379/406.14
2005/0207583 A1 * 9/2005 Christoph ....................... 381/57

OTHER PUBLICATIONS

Y. Ephraim and D. Malah, "Speech enhancement using a minimum mean-square error short-time spectral amplitude estimator," IEEE Trans. Acoustics, Speech and Signal Processing, vol. ASSP-32, No. 6, pp. 1109-1121, Dec. 1984.*
W. Etter and G. S. Moschytz, "Noise reduction by noise-adaptive spectral magnitude expansion," J. Audio Eng. Soc., vol. 42, pp. 341-349, May 1994.*
Y. Ephraim, "Statistical-model-based speech enhancement systems," Proc. IEEE, vol. 80, pp. 1524-1555, Oct. 1992.*
I. Cohen and B. Berdugo, "Noise estimation by minima controlled recursive averaging for robust speech enhancement," IEEE Signal Processing Lett., vol. 9, pp. 12-15, Jan. 2002.*
I. Cohen and B. Berdugo, "Speech Enhancement for Non-Stationary Noise Environments," Signal Processing, vol. 81, No. 11, pp. 2403{2418, Nov. 2001.*

(Continued)

*Primary Examiner* — Richemond Dorvil
*Assistant Examiner* — Greg Borsetti
(74) *Attorney, Agent, or Firm* — Nixon & Vanderhye P.C.

(57) ABSTRACT

A method of analyzing time coherence in the noisy signal including the steps of: a) determining a reference signal from the noisy signal by applying treatment (10, 18) to the noisy signal that is suitable for attenuating speech components more strongly than the noise component, in particular by an adaptive recursive predictive algorithm of the LMS type; b) determining (24) a probability of speech being present/absent on the basis of the respective energy levels in the spectral domain of the noisy signal and of the reference signal; and c) deriving (26) a denoised estimate of the speech signal from the noise signal as a function of the probability of the speech being present/absent as determined in this way.

9 Claims, 1 Drawing Sheet

OTHER PUBLICATIONS

J. Ortega-Garcia, J. Gonzalez-Rodriquez, "Overview of speech enhancement techniques for automatic speaker recognition," in Proc. International Conference on Spoken Language Processing, vol. 2. pp. 929-932, Oct. 1996.*

I. Cohen, "Optimal speech enhancement under signal presence uncertainty using log-spectral amplitude estimator," IEEE Signal Process. Lett., vol. 9, pp. 113-116, Apr. 2002.*

Cohen, 2004b Cohen, I., 2004b. On the decision-directed estimation approach of Ephraim and Malah. In: Proc. 29th IEEE Internat. Conf. Acoust. Speech Signal Process., ICASSP-2004, Montreal, Canada, May 17-21, 2004. pp. I-293-I-296.*

Harrison et al. "A New Application of Adaptive Noise Cancellation", IEEE Transactions on Acoustics, Speech, and Signal Processing, vol. ASSP-34, No. I , Feb. 1986.*

Oppenheim et al. "Single-Sensor Active Noise Cancellation", IEEE Transactions on Speech and Audio Processing, vol. 2, No. 2, Apr. 1994.*

French Search Report for FR 0601822 search completed Oct. 2, 2006.

Cohen et al., *Two-channel signal detection and speech enhancement based on the transient beam-to-reference ratio*, 2003 IEEE International Conference on Acoustics, Speech, and Signal Processing Proceedings, vol. 1, Apr. 6, 2003, pp. V233-V236, XP010639251.

Cohen et al., *Speech enhancement based on a microphone array and log-spectral amplitude estimation*, Electrical and Electronics Engineers in Israel, 2002, pp. 4-6, XP010631024.

* cited by examiner

METHOD OF DENOISING A NOISY SIGNAL INCLUDING SPEECH AND NOISE COMPONENTS

CONTEXT OF THE INVENTION

1. Field of the Invention

The present invention concerns denoising audio signals picked up by a microphone in a noisy environment.

The invention applies advantageously, but in non-limiting manner, to speech signals picked up by telephone appliances of the "hands-free" type, or the like.

Such an appliance has a sensitive microphone that picks up not only the voice of the user, but also the surrounding noise, which noise constitutes a disturbing element that can, in certain circumstances, be sufficient to make the speech of the speaker incomprehensible.

The same applies when it is desired to implement voice recognition techniques, in which it is very difficult to implement form recognition on words buried in a high level of noise.

This difficulty associated with ambient noise is particularly restricting with "hands-free" devices for use in motor vehicles. In particular, the large distance between the microphone and the speaker leads to a relatively high level of noise that makes it difficult to extract the useful signal buried in the noise. In addition, the very noisy surroundings typical of the car environment present spectral characteristics that are not steady, i.e. that vary unpredictably as a function of driving conditions: running over bumpy roads or cobblestones, car radio in operation, etc.

2. Description of Related Art

Various techniques have been proposed for reducing the level of noise in the signal picked up by a microphone.

For example, WO-A-98/45997 (Parrot S A) relies on the activation pushbutton of a telephone (e.g. when the driver seeks to answer an incoming call) in order to detect the beginning of a speech signal, and it considers that the signal as picked up prior to the button being pressed is constituted essentially by a noise signal. The earlier signal, as stored, is analyzed to give a weighted mean energy spectrum of the noise, and is then subtracted from the noisy speech signal.

U.S. Pat. No. 5,742,694 describes another technique, implementing a mechanism of the predictive adaptive filter type. The filter delivers a "reference signal" corresponding to the predictable portion of the noisy signal, and an "error signal" corresponding to the prediction error, and then it attenuates those two signals in varying proportions, and recombines them in order to deliver a denoised signal.

The major drawback of that denoising technique lies in the large amount of distortion introduced by the prefiltering, causing a signal to be output that is highly degraded in terms of sound quality. It is also poorly adapted to situations in which it is necessary for strong denoising of a speech signal that is buried in noise of complex and unpredictable nature, having spectral characteristics that are not steady.

Still other techniques, known as beamforming or double-phoning make use of two distinct microphones. The first microphone is designed and placed to pick up mainly the voice of the speaker, while the other microphone is designed and placed to pick up a noise component that is greater than that picked up by the main microphone. A comparison between the signals as picked up enables voice to be extracted from ambient noise in effective manner, by using software means that are relatively simple.

That technique, which is based on analyzing spatial coherence between two signals, nevertheless presents the drawback of requiring two spaced-apart microphones, thus generally restricting it to installations that are fixed or semi-fixed and preventing it from being integrated in pre-existing apparatus merely by adding a software module. It also assumes that the position of the speaker relative to the two microphones is more or less constant, as is generally true for a car telephone used by the driver. In addition, in order to obtain denoising that is more or less satisfactory, the signals are subjected to a high level of prefiltering, thus likewise leading to the drawback of introducing distortion that degrades the quality of the denoised signal when played back.

The invention relates to a technique of denoising audio signals picked up by a single microphone recording a voice signal in a noisy environment.

Many of the most effective methods implemented in one-microphone systems are based on the statistical model established by D. Malah and Y. Ephraim in:

[1] Y. Ephraim and D. Malah, *Speech enhancement using a minimum mean-square error short-time spectral amplitude estimator*, IEEE Transactions on Acoustics, Speech, and Signal Processing, Vol. ASSP-32, No. 6, pp. 1109-1121, December 1984; and

[2] Y. Ephraim and D. Malah, *Speech enhancement using a minimum mean-square error log-spectral amplitude estimator*, IEEE Transactions on Acoustics, Speech, and Signal Processing, Vol. ASSP-33, No. 2, pp. 443-445, April 1985.

Making the approximation that speech and noise are non-correlated Gaussian processes, and assuming that the spectral power of the noise is a known given, those two articles provide an optimum solution to the above-described problem of reducing noise. That solution proposes subdividing the noisy signal into independent frequency components by using the discrete Fourier transform, applying an optimum gain to each of those components, and then recombining the signal as processed in that way. Those two articles differ on how to select the optimum criterion. In [1], the gain applied is referred to as an "STSA" and serves to minimize the mean square distance between the estimated signal (at the output from the algorithm) and the original (noise-free) speech signal. In [2], applying gain referred to as "LSA" gain serves to minimize the mean square distance between the logarithm of the amplitude of the estimated signal and the logarithm of the amplitude of the original speech signal. The second criterion is found to be better than the first since the selected distance constitutes a much better match to the behavior of the human ear, and thus gives results that are qualitatively better. Under all circumstances, the essential idea is to reduce the energy of very noisy frequency components by applying low gain thereto, while leaving intact (by applying gain equal to 1) those components that contain little or no noise.

Although attractive, since based on a rigorous mathematical proof, that method can nevertheless not be implemented on its own. As mentioned above, the spectral power of the noise is unknown and cannot be predicted beforehand. In addition, that method does not propose evaluating when the speech of the speaker is present in the signal as picked up. It is content merely to assume either that speech is always present, or that it is present for a fixed fraction of the time, which can seriously limit the quality of noise reduction.

It is therefore necessary to use another algorithm having the function of evaluating the spectral power of the noise and the instants at which speaker speech is present in the raw signal as picked up. It is even found that this estimation constitutes the factor that determines the quality of the noise reduction performed, with the Ephraim and Malah algorithm merely constituting the best manner of using the information as obtained in that way.

The present invention relates to an original solution to those two problems of evaluating the noise and of evaluating the instants at which the speech signal is present.

Those two questions are, in reality, intrinsically linked. Assume that the raw signal as picked up is subdivided into frames of equal length, and that the short-term Fourier transform is calculated for each frame. For any frequency component, knowledge of the indices designating frames from which speech is absent makes it possible to evaluate the power of the noise and how it varies over time in that segment of the spectrum. It suffices to measure the energy of the raw signal when speech is absent and to obtain a continuously updated average of those measurements. The main question is thus determining exactly when speech from the speaker is absent from the signal picked up by the microphone.

If the noise is steady or pseudo-steady, the problem can be solved easily by declaring that speech is absent from a spectrum segment of a given frame when the spectral energy of the data for that spectrum segment has varied little or not at all compared with the most recent frame. Conversely, speech is said to be present when behavior is non-steady.

Nevertheless, in a real environment, and a fortiori in a car environment in which the noise includes numerous spectral characteristics that are not steady, as mentioned above, that method is easily fooled, insofar as both speech and noise can present transient behaviors. If it is decided to retain all transient components, residual musical noise will remain in the denoised data; conversely, if it is decided to eliminate transient components below a given energy threshold, then weak speech components will be eliminated, even though such components can be important both in terms of information content and in terms of general intelligibility (low distortion) of the denoised signal as played back after processing.

In this respect, several methods have been proposed. Amongst the most effective, mention can be made of that described by:

[3] I. Cohen and B. Berdugo, *Speech enhancement for non-stationary noise environments*, Signal Processing, Elsevier, Vol. 18, pp. 2403-2418, 2001.

As is frequent in this field, the method described in that article does not set out to identify exactly the frequency components and the frames from which speech is absent, but rather to give a confidence index in the range 0 to 1, the value 1 indicating that speech is certainly absent (according to the algorithm), while the value 0 declares the contrary. By its nature, that index can be considered as the a priori probability of speech being absent, i.e. the probability that speech is absent from a given frequency component of the frame under consideration. Naturally this is not rigorously true, in the sense that even if the presence of speech is probabilistic after the event, the signal picked up by the microphone can at any instant only switch between two distinct states. At any given instant, either it does contain speech or it does not contain speech. Nevertheless, this approach gives good results in practice, thereby justifying its use. In order to estimate this probability of speech being absent, Cohen and Berdugo use averages over a priori signal-to-noise ratios, themselves used and calculated in the algorithm of Ephraim and Malah. The authors also describe a technique they refer to as optimally-modified log-spectral amplitude (OM-LSA) gain, seeking to improve the LSA gain by integrating said probability of speech being absent.

This estimate of the a priori probability of speech being absent is found to be effective, but it depends directly on the statistical method devised by Ephraim and Malah and not on any a priori knowledge of data.

In order to obtain an estimate of the probability of speech being absent that is independent of that statistical model, Cohen and Berdugo have made proposals in:

[4] I. Cohen and B. Berdugo, *Two-channel signal detection and speech enhancement based on the transient beam-to-reference ratio*, Proc. ICASSP 2003, Hong Kong, pp. 233-236, April 2003, to calculate the probability of speech being absent from signals picked up by two microphones in different positions, giving respective signals on two different channels, that can be combined to obtain an output channel and a reference noise channel. The analysis is based on the observation that speech components are relatively weaker on the reference noise channel, and that transient noise components present more or less the same energy on both channels. A probability of speech being present for each spectrum segment of each frame is determined by calculating an energy ratio between the non-steady components of the respective signals on the two channels.

However, as with the beamforming or double-phoning techniques mentioned above, that method is quite constraining insofar as it requires two microphones.

SUMMARY OF THE INVENTION

One of the objects of the invention is to remedy the drawbacks of the methods that have been proposed in the past by using an improved denoising method that can be applied to a speech signal considered in isolation, in particular a signal picked up by a single microphone, which method is based on analyzing the time coherence of the signals as picked up.

The starting point of the invention lies in the observation that speech generally presents time coherence that is greater than that of noise and that, as a result, speech is considerably more predictable. Essentially, the invention proposes making use of this property for calculating a reference signal from which speech has been attenuated more than noise, in particular by applying a predictive algorithm which may be constituted, for example, by an algorithm of the least mean square (LMS) type. The reference signal derived from the speech signal to be denoised can be used in a manner comparable to that derived from the second microphone signal in two-channel beamforming techniques, for example techniques similar to those of Cohen and Berdugo [4, above]. Calculating a ratio between the respective energy levels of the original signal and of the reference signal as obtained in that way makes it possible to distinguish between speech components and non-steady interfering noise, and provides an estimate of the probability that speech is present in a manner that is independent of any statistical model.

In other words, the technique proposed by the invention implements “intelligent” subtraction, implying restoring phase between the original signal and the predicted signal, after performing a linear prediction on earlier samples of the original signal (and not on a signal that has been prefiltered, and thus degraded).

In practice, the technique of the invention is found to provide performance that is sufficiently good to guarantee extremely effective denoising directly on the original signal, while avoiding the distortion introduced by a prefiltering system that is now of no use.

More precisely, in order to denoise a noisy audio signal comprising a speech component combined with a noise component itself comprising a transient noise component and a pseudo-steady noise component, the present invention proposes analyzing the time coherence of the noisy signal by the following steps:

a) determining a reference signal by applying processing to the noisy signal suitable for attenuating the speech components more strongly than the noise components in said noisy signal, said processing comprising: a1) applying an adaptive linear prediction algorithm operating on a linear combination of earlier samples of the noisy signal; and a2) determining said reference signal by taking the difference, with compensation for phase offset, between the noisy signal and the signal delivered by the linear prediction algorithm;

b) determining an a priori probability of speech being present/absent on the basis of the respective energy levels in the spectral domain of the noisy signal and of the reference signal; and c) using said a priori probability of the absence of speech to estimate a noise spectrum and deriving from the noisy signal a denoised estimate of the speech signal.

Said reference signal may in particular be determined by applying in step a2) a relationship of the type:

$$Ref(k,l)=X(k,l)-X(k,l)\frac{|Y(k,l)|}{|X(k,l)|}$$

where X(k,l) and Y(k,l) are the short-term Fourier transforms of each spectrum segment k of each frame l respectively of the original noisy signal and of the signal delivered by the linear prediction algorithm.

Advantageously, the predictive algorithm is a recursive adaptive algorithm of the least mean square (LMS) type.

Advantageously, step b) comprises an algorithm for estimating the energy of the pseudo-steady noise component in the reference signal and in the noisy signal, in particular an algorithm of the minima controlled recursive averaging (MCRA) type as described in:

[5] I. Cohen and B. Berdugo, *Noise estimation by minima controlled recursive averaging for robust speech enhancement*, IEEE Signal Processing Letters, Vol. 9, No. 1, pp. 12-15, January 2002.

Advantageously, step c) comprises applying a variable gain algorithm that is a function of the probability of speech being present/absent, in particular an algorithm of the optimally-modified log-spectral amplitude gain type.

BRIEF DESCRIPTION OF THE DRAWING

There follows a description of an implementation given with reference to the accompanying drawing, in which the same numerical references are used from one figure to another to designate elements that are identical or functionally similar.

DETAILED DESCRIPTION OF THE PREFERRED IMPLEMENTATION

The signal which it is desired to denoise is a sampled digital signal x(n) where n designates the sample number (n is thus the time variable).

The sensed signal x(n) is a combination of a speech signal s(n) and non-correlated added noise d(n):

$$x(n)=s(n)+d(n)$$

This noise d(n) has two independent components, specifically a transient component $d_t(n)$ and a pseudo-steady component $d_{ps}(n)$:

$$d(n)=d_t(b)+d_{ps}(n)$$

Figure 1:
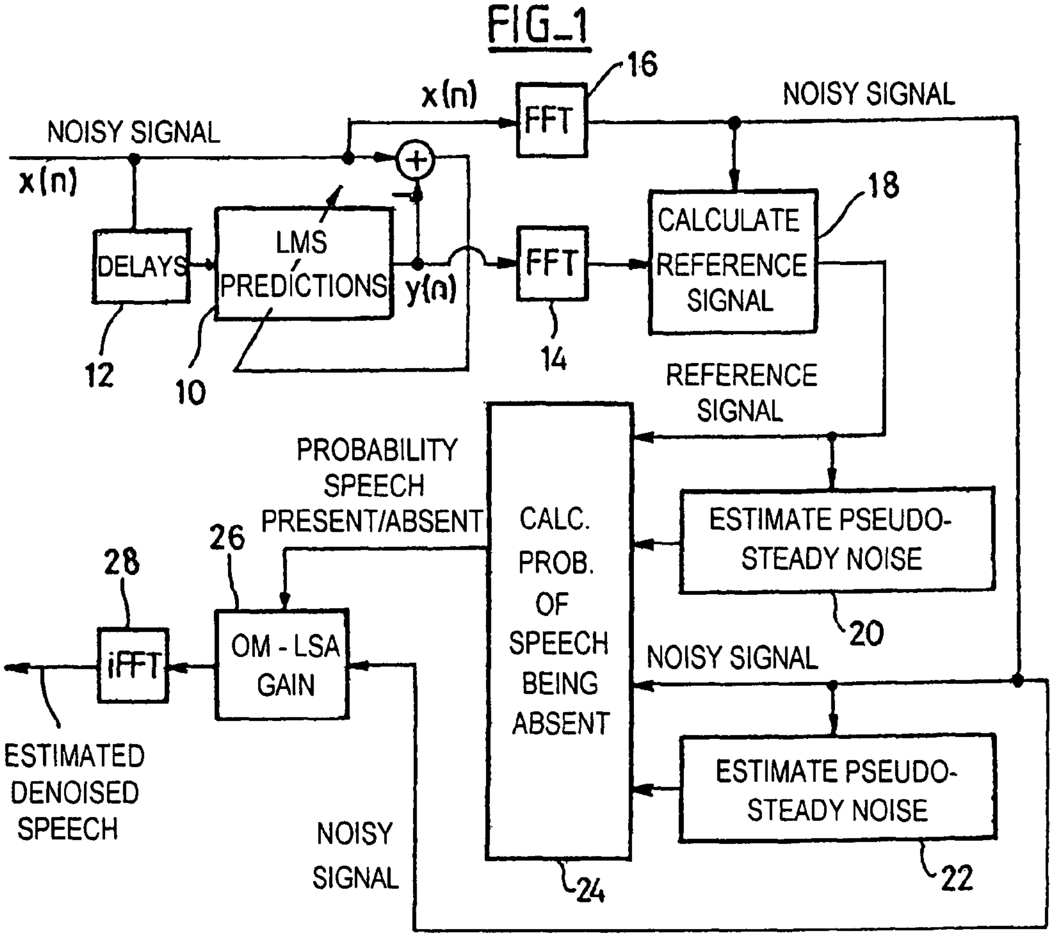
FIG. 1 is a block diagram showing the various operations performed by a denoising algorithm in accordance with the method of the invention.

As shown in FIG. 1, the noisy signal x(n) is applied to the input of a predictive LMS algorithm represented diagrammatically by block 10, and including the application of appropriate delays 12. The operation of this LMS algorithm is described in greater detail below with reference to FIG. 2.

Thereafter, the short-term Fourier transform of the sensed signal x(n) is calculated (block 16) as is the signal y(n) delivered by the predictive LMS algorithm (block 14). A reference signal is calculated (block 18) from these two transforms, which reference signal constitutes one of the input variables to an algorithm for calculating (block 24) the possibility of speech being absent. In parallel, the transform of the noisy signal x(n) as delivered by block 16 is also applied to the probability calculation algorithm.

The blocks 20 and 22 estimate the pseudo-steady noise from the reference signal and from the transform of the noisy signal, and the results are likewise applied to the probability calculation algorithm.

The result of calculating the probability of speech being absent, together with the transform of the noisy signal are applied as inputs to an OM-LSA gain processing algorithm (block 26), delivering a result that is subjected to an inverse Fourier transform (block 28) to give an estimate of denoised speech.

There follows a description in greater detail of the various stages of this processing.

Figure 2:
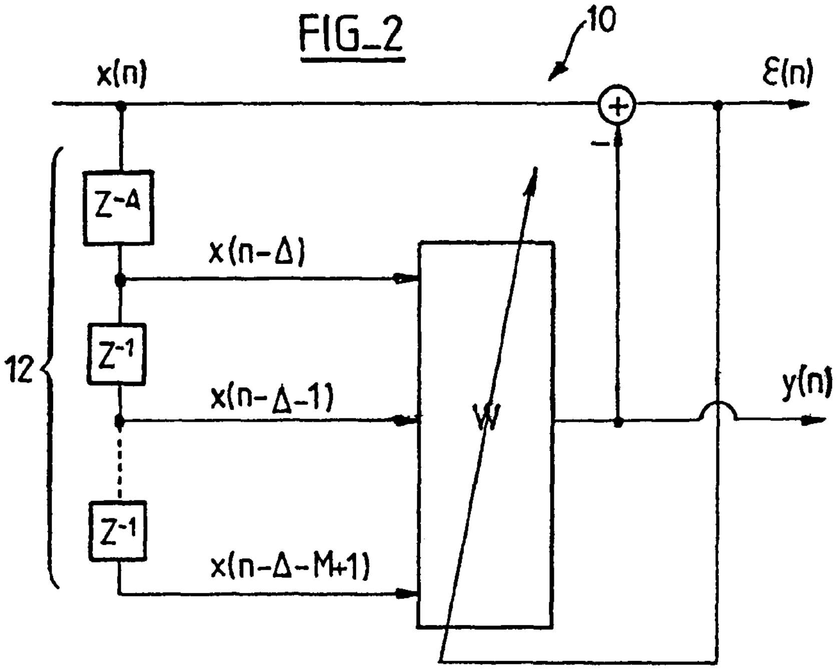
FIG. 2 is a block diagram showing more particularly the adaptive LMS predictive algorithm.

The LMS predictive algorithm (block 10 is shown diagrammatically in FIG. 2.

Insofar as the signals present are non-steady overall but pseudo-steady locally, it is advantageously possible to use an adaptive system capable of taking account of variations in the energy of the signal over time and of converging on various local optima.

Essentially, if successive delays Δ are applied, the linear prediction y(n) of the signal x(n) is a linear combination of earlier samples $\{x(n-\Delta-i+1)\}_{1\leqq i\leqq M}$:

$$y(n)=\sum_{i=1}^{M}w_i x(n-\Delta-i+1)$$

which minimizes the mean square error of the prediction error:

$$\epsilon(n)=x(n)-y(n)$$

Minimization consists in finding:

$$\min_{w1,w2,\ldots wM} E\left[x(n)-\sum w_i x(n-\Delta-i+1)\right]^2$$

To solve this problem, it is possible to use an LMS algorithm, which algorithm is itself known, as described for example in:

[6] B. Widrow, *Adaptive filters, aspects of network and system theory*, R. E. Kalman and N. DeClaris (Eds.), New York: Holt, Rinehart and Winston, pp. 563-587, 1970; and

[7] B. Widrow et al., *Adaptive noise cancelling: principles and applications*, Proc. IEEE, Vol. 63, No. 12, pp. 1692-1716, December 1975.

It is possible to define a recursive method for adapting the weights.

$$w_i(n+1)=w_i(n)+2\mu\epsilon(n)\times(n-\Delta-i+1)$$

where μ is a gain constant that enables the speed and the stability of the adaptation to be adjusted.

General indications about these aspects of the LMS algorithm can be found in:

[8] B. Widrow and S. Stearns, *Adaptive signal processing*, Prentice-Hall Signal Processing Series, Alan V. Oppenheim Series Editor, 1985.

It can be shown that such an adaptive linear predictive enables noise and speech to be distinguished effectively since samples that contain speech are predicted better (smaller quadrative errors between the prediction and the raw signal) than are samples that contain only noise.

More precisely, the respective signals x(n) and y(n) (noisy speech signal and linear prediction) are subdivided into frames of identical length, and the short-term Fourier transforms (written respectively X and Y) are calculated for each frame. In order to avoid the effects of precision errors, the algorithm provides for an overlap of 50% between consecutive frames, and the samples are multiplied by the coefficients of the Hanning window so that adding even frames and odd frames corresponds to the original signal proper. For the spectrum segment k of an even frame l, the following applies:

$$X(k,l)=\sum_{p=1}^{R}h(p)x(Rl+p)e^{-j2\pi\frac{pk}{R}}$$

and for the spectrum segment k of an odd frame l it is possible to write:

$$X(k,l)=\sum_{p=1}^{R}h(p)x\left(\frac{R}{2}l+p\right)e^{-j2\pi\frac{pk}{R}}$$

where h is the Hanning window.

A first possibility consists in defining the reference signal by presenting the Fourier transform of the prediction error:

$$\hat{\epsilon}(k,l)=X(k,l)-Y(k,l)$$

Nevertheless, a certain phase offset is observed in practice between X and Y due to the imperfect convergence of the LMS algorithm, and that prevents good discrimination between speech and noise. It is therefore preferable to adopt a different definition for the reference signal that compensates for this phase offset, i.e.:

$$Ref(k,l)=X(k,l)-X(k,l)\frac{|Y(k,l)|}{|X(k,l)|}$$

It is assumed that the spectral energy of the reference signal can be written in the form:

$$E[\mathrm{Ref}(k,l)]^2=E[S(k,l)]^2\alpha_S(k)+E[D_i(k,l)]^2\alpha_{D_i}(k)+E[D_{ps}(k,l)]^2\alpha_{D_{ps}}(k)$$

where $$\alpha_S(k)<\alpha_{D_i}(k)<\alpha_{D_{ps}}(k)$$

represents the attenuation on the reference signal of the three signals in each spectrum segment.

The following step consists in delivering an estimate q(k,l) of the probability of speech being absent from the noisy signal:

$$q(k,l)=Pr\{H_0(k,\lambda)\}$$

where $H_0(k,l)$ indicates the absence of speech (and $H_1(k,l)$ the presence of speech) in the $k^{th}$ spectrum segment of the $l^{th}$ frame.

Discrimination between transient noise and speech can be performed by a technique comparable to that of Cohen and Berdugo [5, above]. More precisely, the algorithm of the invention evaluates a ratio of the transient energies present on the two channels, as given by:

$$\Omega(k,l)=\frac{SX(k,l)-MX(k,l)}{SRef(k,l)-MRef(k,l)}$$

S being a smoothed estimate of the instantaneous energy:

$$SX(k,l)=SX(k,l-1)+\sum_{i=-\omega}^{\omega}b(i)\left|\hat{X}(k,l)\right|^2$$

where b is a window in the time domain and M is an estimator of pseudo-steady energy, that can be obtained for example by a minima controlled recursive averaging (MCRA) method of the same type as that described by Cohen and Berdugo [5, above] (nevertheless, several alternatives exist in the literature).

In the presence of speech but in the absence of transient noise, this ratio is approximately:

$$\Omega(k,l)=\frac{1}{\alpha_{D_1}(k)}=\Omega_{\max}(k)$$

Conversely, in the absence of speech but in the presence of transient noise:

$$\Omega(k,l)=\frac{1}{\alpha_S(k)}=\Omega_{\min}(k)$$

If it is assumed that in general:

$$\Omega_{min}(k)\geqq\Omega(k,l)\geqq\Omega_{max}(k)$$

then a procedure for estimating q(k,l) is given by the following metalanguage algorithm:

For each frame l and for each spectrum segment k, (i) Calculate SX(k,l), MX(k,l) Sref(k,l) and MRef(k,l). Go to (ii).

(ii) If SX(k,l)>$L_X$MX(k,l) (transients detected on the noisy speech channel), then go to (iii), else $$q(k,l)=1$$

(iii) If SRef(k,l)>$L_{Ref}$MRef(k,l) (transients detected on the reference channel), then go to (iv), else $$q(k,l)=0$$

(iv) Calculate Ω(k,l). Go to (v).

(v) Calculate:

$$q(k,l)=\max\left(\min\left(\frac{\Omega_{\max}(k)-\Omega(k,l)}{\Omega_{\max}(k)-\Omega_{\min}(k)},1\right),0\right)$$

The constants $L_X$ and $L_{Ref}$ are transient detection thresholds. $\Omega_{min}(k)$ and $\Omega_{max}(k)$ are top and bottom limits for each spectrum segment. These various parameters are selected so as to correspond to typical situations that are close to reality.

The following step (corresponding to block 26 in FIG. 1) consists in performing denoising proper (reinforcing the speech component). The estimator described above is applied to the statistical model described by Ephraim and Malah [2, above], which assumes that the noise and the speech in each spectrum segment are independent Gaussian processes having respective variances $\lambda_x(k,l)$ and $\lambda_d(k,l)$.

This step may advantageously implement the optimally modified log-spectral amplitude (OM-LSA) gain algorithm described by Cohen and Berdugo [3, above]. The a priori signal-to-noise ratio is defined by:

$$\xi(k,l)=\frac{\lambda_x(k,l)}{\lambda_d(k,l)}$$

The a posteriori signal-to-noise ratio is defined by:

$$\gamma(k,l)=\frac{|X(k,l)|^2}{\lambda_d(k,l)}$$

The conditional probability of signal being present is:

$$p(k,l)=Pr(H_1(k,l)|X(k,l))$$

On the Gaussian assumption and with the above parameters, this gives:

$$p(k,l)=\left\{1+\frac{q(k,l)}{1-q(k,l)}(1+\xi(k,l))\exp(-v(k,l))\right\}^{-1}$$

with:

$$v(k,l)=\frac{\gamma(k,l)\xi(k,l)}{1+\xi(k,l)}$$

The optimum estimate of denoised speech S(k,l) is given by:

$$\hat{S}(k,l)=G_{H_1}(k,l)^{p(k,l)}G_{min}{}^{1-p(k,l)}X(k,l)$$

where $G_{H1}$ is the gain on the assumption that speech is present, and is defined by:

$$G_{H_1}(k,l)=\frac{\xi(k,l)}{1+\xi(k,l)}\exp\left(\frac{1}{2}\int_{v(k,l)}^{\infty}\frac{e^{-1}}{t}dt\right)$$

The gain $G_{min}$ on the assumption that speech is absent is a lower limit for reducing noise, in order to limit distortion of speech. The conventional formula for a priori estimation of the signal-to-noise ratio is:

$$\hat{\xi}(k,l)=aG_{H_1}{}^2(k,l-1)\gamma(k,l-1)+(1-a)\max(\gamma(k,l)-1,0)$$

The estimated energy of the noise is given by:

$$\hat{\lambda}_d(k,l+1)=\tilde{a}_d(k,l)\hat{\lambda}_d(k,l)+\beta(1-\tilde{a}_d(k,l))|X(k,l)|^2$$

The smoothing parameter $\tilde{a}_d$ varies between a bottom limit $a_d$ and 1, as a function of the conditional presence probability:

$$\hat{a}_d(k,l)=a_d+(1-a_d)p(k,l)$$

where β is an overestimation factor that compensates bias in the absence of any signal.

The signal obtained at the end of this processing is subjected to an inverse Fourier transform (block 28) in order to give the final estimate of the denoised speech.

The algorithm of the present invention has been found to be particularly effective in noisy environments, suffering simultaneously from mechanical noise, vibration, etc., and from musical noise, characteristic situations that are to be found in a car cabin. Spectrograms show that the noise attenuation is not only effective, but takes place without significant distortion of the denoised speech.

The invention claimed is:

1. In a data processing apparatus, a method of denoising an original noisy signal, said original noisy signal including a speech component and a noise component, the noise component comprising a transient noise component and a pseudo-steady noise component, the method comprising analyzing time coherence of the sampled noisy signal comprising the steps of:

a) determining a reference signal by processing the original noisy signal by attenuating the speech components more strongly than the noise component, said processing comprising:

a1) applying an adaptive linear prediction algorithm operating on a linear combination of a plurality of samples of the noisy signal, said samples of said noisy signals temporally taken prior to said original noisy signal, to produce a predictive signal; and a2) determining said reference signal by taking the difference, with compensation for phase offset, between the original noisy signal and the predictive signal delivered by the linear prediction algorithm;

b) determining probability of speech being absent on the basis of the respective energy levels in the spectral domain of the original noisy signal and of the reference signal; and c) using said probability of the absence of speech to estimate a noise spectrum and deriving from the original noisy signal a denoised estimate of the speech signal;

wherein the noisy signal is received by a single microphone.

2. The method of claim 1, in which said reference signal is determined by applying in step a2) a relationship of the type:

$$Ref(k,l)=X(k,l)-X(k,l)\frac{|Y(k,l)|}{|X(k,l)|}$$

where X(k,l) and Y(k,l) are the short-term Fourier transforms of each spectrum segment k of each frame l respectively of the original noisy signal and of the signal delivered by the linear prediction algorithm.

3. The method of claim 1, in which the linear prediction algorithm is an algorithm of the least mean square (LMS) type.

4. The method of claim 1, in which the linear prediction algorithm is a recursive adaptive algorithm.

5. The method of claim 1, in which step b) comprises an algorithm for estimating the energy of the pseudo-steady noise component in the reference signal and in the noisy signal.

6. The method of claim 5, in which the algorithm for estimating the energy of the pseudo-steady noise component is an algorithm of the minima controlled recursive averaging (MCRA) type.

7. The method of claim 1, in which step c) further comprises applying a variable gain algorithm that is a function of the probability of speech being present/absent.

8. The method of claim 7, in which the variable gain algorithm is an algorithm of the optimally-modified log-spectral amplitude (OM-LSA) gain type.

9. The method of claim 1, wherein said data processing apparatus comprises a hands free apparatus for mobile telephones.

* * * * *